United States Patent [19]
Cheston et al.

[11] Patent Number: 6,167,494
[45] Date of Patent: Dec. 26, 2000

[54] METHOD AND SYSTEM FOR RECOVERING FROM OPERATING SYSTEM FAILURE

[75] Inventors: Richard W Cheston, Morrisville, N.C.; Roger Philip Hoggarth, Ayrshire; Richard Ian Knox, Renfrewshire, both of United Kingdom; Howard J Locker, Cary; David Benson Rhoades, Apex, both of N.C.

[73] Assignee: International Business Machine Corporation, Armonk, N.Y.

[21] Appl. No.: 09/067,630

[22] Filed: Apr. 28, 1998

[51] Int. Cl.[7] .............................. G06F 12/00; G06F 12/14
[52] U.S. Cl. .......................... 711/162; 711/129; 711/163
[58] Field of Search ..................................... 711/162, 129, 711/163

[56] References Cited

U.S. PATENT DOCUMENTS

| 5,220,682 | 6/1993  | Tomohiro        | 455/161.2 |
| 5,276,867 | 1/1994  | Kenley et al.   | 707/204   |
| 5,367,682 | 11/1994 | Chang           | 713/1     |
| 5,471,662 | 11/1995 | Shiota          | 455/166.1 |
| 5,487,160 | 1/1996  | Bemis           | 711/114   |
| 5,745,845 | 4/1998  | Suenaga et al.  | 455/194.1 |
| 5,809,543 | 9/1998  | Byers et al.    | 711/162   |
| 5,926,836 | 7/1999  | Blumenau        | 711/162   |

FOREIGN PATENT DOCUMENTS 0 767 431   4/1997   European Pat. Off. .

OTHER PUBLICATIONS

Research Disclosure n 315, "Mirroring of Data on a Partition Basis", Jul. 1990.

D J Winarski and T Y Winarski, IBM Technical Disclosure Bulletin, v 39, n 8, "Multimedia Byte for Partial Mirroring", Aug. 1996, pp. 15–17.

J W Blackledge et al, IBM Technical Disclosure Bulletin v 35, n 4b, "User Data Area Protection", pp. 481–483, Sep. 1992.

J L Craft and J M Shieh, IBM Technical Disclosure Bulletin, v 36, n 12, "Automtic Swap of the Primary and Secondary Mirrors in a Disk Mirror System", pp. 85–86, Dec. 1993.

*Primary Examiner*—John W. Cabeca
*Assistant Examiner*—Matthew D. Anderson
*Attorney, Agent, or Firm*—Anthony N. Magistrale; Andrew Dillon

[57] ABSTRACT

A method, system and computer program product in which half of the storage space on a non-volatile storage device is used to maintain a copy of the last "known-good" copy of the operating system and on invocation by a user, restoring from this backup copy when, for example, the operating system has become corrupted due to changes made to settings or device drivers.

8 Claims, 3 Drawing Sheets

6,167,494

METHOD AND SYSTEM FOR RECOVERING FROM OPERATING SYSTEM FAILURE

FIELD OF THE INVENTION

The present invention relates to recovery of data on computer non-volatile storage, particularly where the corruption of the data causes the operating system of the computer to be corrupted and the computer to be incapable of booting up.

BACKGROUND OF THE INVENTION

Personal computer systems are well known in the art. Personal computer systems in general, and IBM Personal Computers in particular, have attained widespread use for providing computer power to many segments of today's modern society. These systems are designed primarily to give independent computer power to a single user and are inexpensively priced for purchase by individuals or small businesses. Personal computers can typically be defined as desktop, floor standing, or portable computers that consist of a system unit having a single central processing unit (CPU) and associated volatile and non-volatile memory, including RAM and BIOS ROM.

The capacity of disk drives used in such computers is now so high that it is unlikely that an average end user will ever require all the space available. However, a problem which still remains is that it is very easy for the end user to change some setting or device driver, particularly in the operating system of the computer, which prevents the computer booting successfully. Even if the end user remembers exactly what was changed, it may not be possible to undo the change if the end user has had to boot from a diskette drive to restart the computer. In many computers, booting from a diskette drive provides only a command prompt and from such a command prompt it may not be obvious which files have changed. The problem is potentially much worse for laptop users because their installation disks may be at another location such as at home or in a remote office.

European patent EP 0 767 341 discloses a method of backing up a computer disk to another backup medium using the operating system to read a set of logically contiguous sectors from a primary store and write them to a backup medium. The data is restored from the backup medium using a similar set of operating system calls. Mapping is performed by the operating system to take into account physical flaws on the media. The method in this patent relies on the operating system functioning correctly and does not allow restoration of data in order to overcome operating system corruption due to an end user changing a setting or a device driver.

Research Disclosure n.315, "Mirroring of Data on a Partition Basis", July 1990, discloses a technique for mirroring data on a partition by partition basis. Mirroring can be selected for all of the logical partitions of a disk volume, for none of the logical partitions of a disk volume or for all of the logical partitions of a disk volume. The disk mirroring is done by the filing system and so is dependent on the computer being able to boot up and the operating system being able to start.

IBM Technical Disclosure Bulletin v.39, n.8, "Multimedia Byte for Partial Mirroring", D. J. Winarski & T. Y. Winarski, August 1996, discloses the use of a multimedia byte in the header information of files. The multimedia byte depicts the source of the application or file. These may be, for example, CD-ROM, Floppy Disk, 8 mm Tape, Downloaded from Lan, Application Output or many others. The byte can be used to control partial mirroring, where only those files which cannot easily be retrieved from another source are copied to another media. In order to use the partial mirroring described in this disclosure, the header bytes of files must be read, which means that it is filing system dependent and the operating system must be functional.

IBM Technical Disclosure Bulletin v.36, n.12, "Automatic Swap of the Primary and Secondary Mirrors in a Disk Mirror System", J. L. Craft, J. M. Shieh, December 1993, discloses a system in which sequential mirroring using a Primary and a Secondary partition (or a disk) is used. In normal operation, read or write commands are issued first to the Primary mirror. Write commands are then mirrored onto the Secondary mirror. In the event that data cannot be read from the Primary mirror, an attempt is made to read the data from the Secondary mirror. When the system detects that the Primary mirror may be failing, then it switches the roles of the Primary and Secondary mirrors, so as to increase disk access efficiency. The system cannot detect when the operating system is not functioning due to the end user changing settings or device drivers.

IBM Technical Disclosure Bulletin v.35, n.4b, "User Data Area Protection", J. W. Blackledge, J. F. LaPenta Jr., September 1992, discloses a technique which avoids overwriting user data so that no inadvertent destruction of data occurs. Systems which use Initial Microcode Load (IML) have system information stored in, for example, the last 3 Megabytes of the hard disk. When system files are restored from a backup diskette, a check is made of the partition signature bytes. If these are a predetermined signature, the restoration program knows that it is possible that IML data may be overwritten and the user is prompted as to whether this should be done.

It would be advantageous if a method of recovering from operating system corruption which did not rely on the operating system functioning sufficiently to perform restoration could be provided.

SUMMARY OF THE INVENTION

Accordingly the invention provides a method for recovery from corruption of data stored on a computer non-volatile storage device, the method comprising the steps of: partitioning the non-volatile storage device into a plurality of partitions, including at least a first and a second partition, the first partition storing data, the second partition being capable of storing at least as much data as the first partition; and backing up substantially all of the data stored in the first partition to corresponding locations in the second partition; on corruption of data stored in the first partition: on invocation by a user, restoring substantially all of the stored data from the second partition to corresponding locations in the first partition.

In the event of failure of the operating system due to the end user altering a setting or a device driver, which can be regarded as corruption of data, the end user may invoke a restoration routine at a level below the operating system, that restores the operating system (and other data) from the backup copy stored on the second partition.

In a preferred embodiment, the first and second partitions are stored on the same physical disk. Since computer disk storage capacity is now so large, the use of half of the disk storage as a backup does not impact the end user, who still has sufficient storage capacity in the computer. In an alternative embodiment, the first and second partitions are stored on different physical disks. This has the advantage of providing a backup unaffected by certain hardware failures of the physical disk carrying the first partition, although this does not provide protection against failure of the physical disk carrying the first partition.

Preferably the second partition is not accessible to the end user. This may be achieved by using a special type of disk partition which is 'invisible' to the operating system. This partition cannot be viewed, altered or deleted using the FDISK program or any standard operating system command, such as the FORMAT command.

Preferably, the invocation by a user is by means of a pre-determined combination of one or more key depressions on a keyboard. This provides a simple means of invoking the restoration function by means of a combination of keys which a user depresses, in a similar way to the invocation of a reboot function when the combination of Ctrl, Alt and Del are depressed or in a similar manner to the use of F1 during initialisation on some personal computers to enter a setup routine or Ctrl and A to enter a diagnostic routine.

Further preferably, no operating system is running on the computer at the time when the restoring step is being executed. This is achieved by either initiating the restoring step through the BIOS (Basic Input/Output System) or POST (Power On Self Test) code or by effectively causing the computer to re-boot the operating system, the operating system initialisation code being replaced by the restoration code.

The invention also provides a data processing system having data stored on a non-volatile storage, the data processing system comprising: non-volatile storage, divided into a plurality of partitions, including at least a first and a second partition, the first partition storing data, the second partition capable of storing at least as much data as the first partition; means for backing up substantially all of the data stored in the first partition to corresponding locations in the second partition; means for restoring substantially all of the stored data from the second partition to corresponding locations in the first partition; and means for invocation, by a user, of the restoring means so as to restore the operating system.

Further provided by the invention is a computer program product for recovery from corruption of data stored on a computer non-volatile storage device, the program product comprising: means for partitioning the non-volatile storage into a plurality of partitions, including at least a first and a second partition, the first partition storing at data, the second partition capable of storing at least as much data as the first partition; means for backing up substantially all of the stored data from the first partition to corresponding locations in the second partition; and means, responsive to corruption of the data stored in the first partition and responsive to invocation by an end-user, for restoring substantially all of the data from the second partition to corresponding locations in the first partition.

BRIEF DESCRIPTION OF THE DRAWINGS

Embodiments of the invention will now be described, by way of example, with reference to the accompanying drawings, in which.

DETAILED DESCRIPTION OF THE PREFERRED EMBODIMENT

Figure 1:
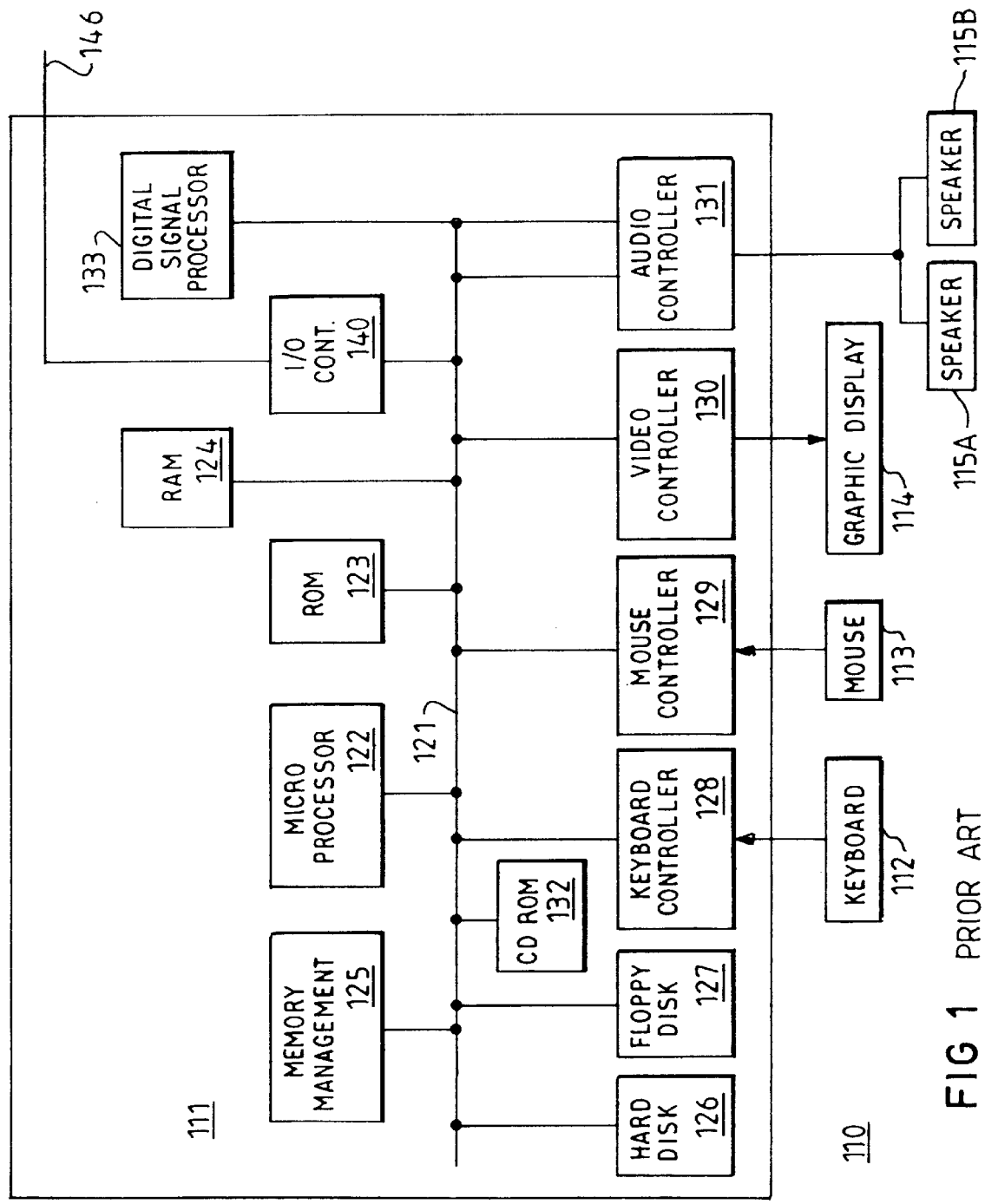
FIG. 1 is a block diagram of a prior art computer system in which the present invention may be used.

In FIG. 1, a prior art computer 110, comprising a system unit 111, a keyboard 112, a mouse 113 and a display 114 are depicted in block diagram form. The system unit 111 includes a system bus or plurality of system buses 121 to which various components are coupled and by which communication between the various components is accomplished. The microprocessor 122 is connected to the system bus 121 and is supported by read only memory (ROM) 123 and random access memory (RAM) 124 also connected to system bus 121. In many typical computers the microprocessors including the 386, 486 or Pentium microprocessors (Intel and Pentium are trademarks of Intel Corp.). However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM, or other microprocessors from Hewlett Packard, Sun, Motorola and others may be used in the specific computer.

The ROM 123 contains among other code the Basic Input-Output system (BIOS) which controls basic hardware operations such as the interaction between the CPU and the disk drives and the keyboard. The RAM 124 is the main memory into which the operating system and application programs are loaded. The memory management chip 125 is connected to the system bus 121 and controls direct memory access operations including, passing data between the RAM 124 and hard disk drive 126 and floppy disk drive 127. The CD ROM 132 also coupled to the system 121 is used to store a large amount of data, e.g. a multimedia program or presentation. CD ROM 132 may be an external CD ROM connected through an adapter card or it may be an internal CD ROM having direct connection to the motherboard.

Also connected to this system bus 121 are various I/O controllers: the keyboard controller 128, the mouse controller 129, the video controller 130 and the audio controller 131. As might be expected, the keyboard controller 128 provides the hardware interface for the keyboard 112, the mouse controller 129 provides the hardware interface for mouse 113, the video controller 130 is the hardware interface for the display 114, and the audio controller 131 is the hardware interface for the speakers 115a and 115b. An I/O controller 140 such as a Token Ring adapter card enables communication over a network 146 to other similarly configured data processor systems. These I/O controllers may be located on the motherboard or they may be located on adapter cards which plug into the motherboard, either directly or into a riser card. The adapter cards may communicate with the motherboard using a PCI interface, an ISA or EISA interface or other interfaces.

On the hard disk 126, it is possible to create a special type of disk partition which is 'invisible' to the operating system. Such a partition has been used on personal computers such as the Model 95 from International Business Machines Corporation to contain the power-on self-test (POST) and Basic Input/Output System (BIOS) code. This partition cannot be viewed, altered or deleted using the FDISK program or any standard operating system command, such as the FORMAT command.

Figure 2:
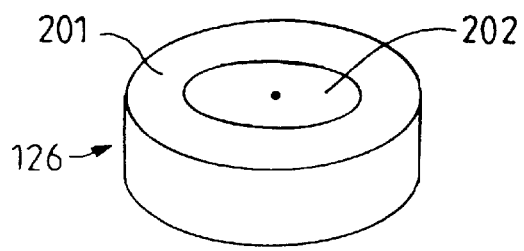
FIG. 2 is a diagram of the hard disk of FIG. 1, showing two partitions on the disk.

FIG. 2 shows a hard disk 126, having a partition 201 which occupies the first half of the contents of the hard disk and a partition 202 which occupies the second half of the contents of the hard disk. The contents of the first half can be backed up to the second half. This backup of the first half to the second half is performed by the end user using an application program which copies every sector of the first half of the disk to the corresponding sector of the second half. The application program does not need to concern itself with the partitioning or format of the first half of the disk because it needs perform no interpretation of the data which is read. The physical locations of the two halves on the disk may vary from that shown in FIG. 2, in which the first half is shown as the outer part of the disk. In a second embodiment, two hard disks may be used, with the contents of a first hard disk being regarded as the first half of the contents of the disk and the contents of a second hard disk being regarded as the second half of the contents of the disk.

The end user should only perform such a backup when he/she knows that the first half of the disk contains 'good' data. Suitable times when the first half of the disk is known to contain 'good', data are immediately after the system is first installed or immediately after a successful bootup. Once the data is copied to the second half of the disk, the end user is unable to alter the copied data on the second half of the disk using anything other than the backup application program so the backup copy of the data will be unaffected by any alterations which the end user makes to the setup of the operating system or device drivers because these changes only affect the active half, that is the first half, of the disk.

Figure 3:
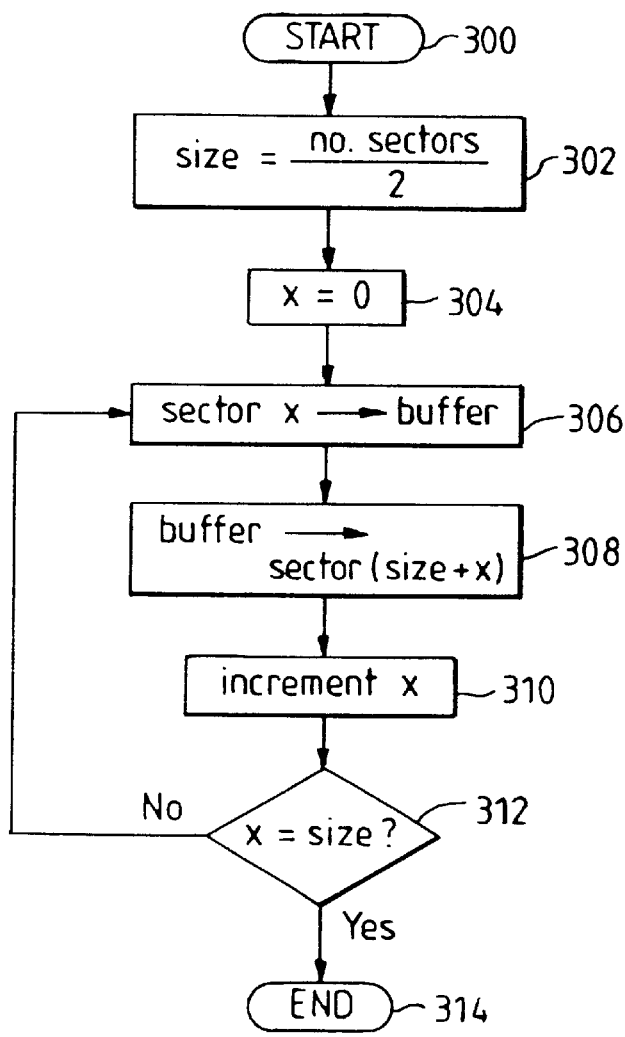
FIG. 3 is a flow diagram of the processing steps performed during the backup process of the present invention.

FIG. 3 shows a flow diagram of the processing performed by the backup program. The backup process starts at step 300. At step 302, the variable size is set to be equal to the number of sectors on disk divided by two. At step 304, a sector counter x is set to 0. The sector counter counts the number of sectors which have been copied from the first half to the second half of the disk. At step 306, a sector numbered x is read and stored into a buffer. At step 308, the contents of the buffer are written to a sector numbered (size+x) and the write is verified to confirm that the data has been correctly written. At step 310, the variable x is incremented and tested at step 312 against the variable size. If x is equal to size, then processing terminates at 314, otherwise processing returns to step 306 and the next sector is read.

The POST/BIOS code held in ROM provides the converse function, invoked via a special key combination during bootup, which copies each sector of the second half of the disk (the backup copy) to the corresponding sector of the first half of the disk (the working copy). Because the copy is performed at the sector level, the ROM code needs no knowledge of the partitioning, formatting, operating system or data content of the sectors which it is copying. (This means that different operating system partitions using different file systems e.g. FAT, HPFS or NTFS are supported without additional function in the ROM). When the restore is complete, the data on the disk drive will be exactly the same as when the last backup was performed and the computer will be able to boot from this 'known good' configuration.

Figure 4:
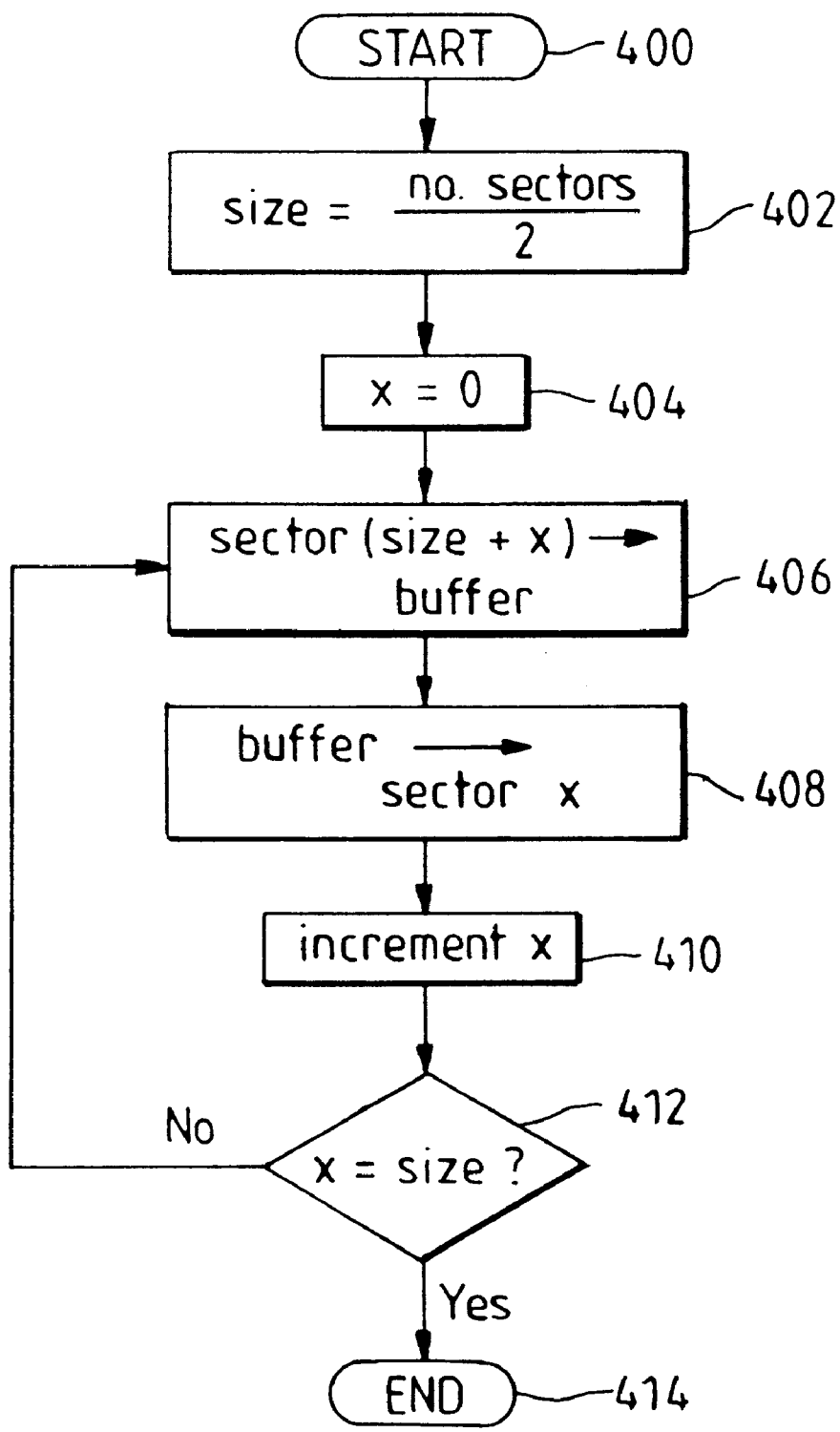
FIG. 4 is a flow diagram of the processing steps performed during the recovery process of the present invention.

FIG. 4 shows a flow diagram of the processing performed by the restore program. The restore process starts at step 400. At step 402, the variable size is set to be equal to the number of sectors on disk divided by two. At step 404, a sector counter x is set to 0. The sector counter counts the number of sectors which have been copied from the first half to the second half of the disk. At step 406, a sector numbered (size+x) is read and stored into a buffer. At step 408, the contents of the buffer are written to a sector numbered x and the write is verified to confirm that the data has been correctly written. At step 410, the variable x is incremented and tested at step 412 against the variable size. If x is equal to size, then processing terminates at 414, otherwise processing returns to step 406 and the next sector is read.

Additional space may be required to be set aside to allow for bad blocks on the disk although modern hard disks are usually capable of doing this under the covers using spare sectors which are maintained for this purpose. In all cases however, the second 'half', of the disk must be at least as big as the first 'half'.

It will be seen that because neither the backup nor the restore is concerned with the data content of each sector, the disk may be partitioned to contain different operating systems, boot manager etc.

It will further be understood that the invention also supports operating system extensions which compress data before writing it to disk. This is because the invention makes no attempt to interpret the data stored in the disk sectors so the compression is completely invisible to the invention, the invention only backing up what is actually stored on the disk and recovering back what was actually stored on the disk.

What is claimed is:

1. A method for preventing user-inaccessibility to application data and operating system data stored in a non-volatile storage device within a computer system resulting from corruption of said operating system data, said method comprising the steps of:

partitioning said non-volatile storage device into a first partition that stores application data and operating system data within at least one sector, wherein said operating system data includes filing level instructions for managing said application data and operating system data within said first partition;

partitioning said non-volatile storage device into a second partition that is transparent to said filing level instructions, wherein said second partition includes at least one sector corresponding to each of said at least one sector included within said first partition; and writing said application data and operating system data within said first partition to said second partition on a sector-by-sector basis, such that upon an operating system failure, said application data and said operating system data may be restored from said second partition to said first partition without utilizing said filing level instructions.

2. The method as claimed in claim 1 wherein said non-volatile storage device is a single data storage disk, and wherein said partitioning step further comprises the step of partitioning said single data storage disk into a plurality of partitions, including a first and second partition, said first partition storing data, and said second partition being capable of storing at least as much data as the first partition.

3. The method of claim 1, wherein said writing step further comprises the steps of:

sequentially copying said application data and said operating system data into a buffer from each of said at least one sector within said first partition; and in response to each copying sequence in which said application data and operating system data from each of said at least one sector is copied into a buffer, writing the contents of said buffer into a corresponding sector within said second partition.

4. A data processing system having non-volatile storage, said data processing system comprising:

a first partition within said non-volatile storage that stores application data and operating system data within at least one sector, wherein said operating system data includes filing level instructions for managing said application data and operating system data within said first partition;

a second partition within said non-volatile storage that is transparent to said filing level instructions, wherein said second partition includes at least one sector corresponding to each of said at least one sector included within said first partition; and processing means for writing said application data and operating system data within said first partition to said second partition on a sector-by-sector basis, such that upon failure of said operating system, said application data and said operating system data may be restored from said second partition to said first partition without utilizing said filing level instructions.

5. The system of claim 4 wherein said non-volatile storage device is a single data storage disk.

6. The system of claim 4, wherein said processing means for writing said application data and operating system data within said first partition to said second partition on a sector-by-sector basis further comprises:

processing means for sequentially copying said application data and said operating system data into a buffer from each of said at least one sector within said first partition; and processing means, response to each copying sequence in which said application data and operating system data from each of said at least one sector is copied into a buffer, for writing the contents of said buffer into a corresponding sector within said second partition.

7. A computer program product for preventing user-inaccessibility to application data and operating system data stored on a computer non-volatile storage device resulting from corruption of said operating system data, said computer program product comprising:

instruction means for partitioning said non-volatile storage device into a first partition that stores application data and operating system data within at least one sector, wherein said operating system data includes filing level instructions for managing said application data and operating system data within said first partition;

instruction means for partitioning said non-volatile storage device into a second partition that is transparent to said filing level instructions, wherein said second partition includes at least one sector corresponding to each of said at least one sector included within said first partition; and instruction means for writing said application data and operating system data within said first partition to said second partition on a sector-by-sector basis, such that upon failure of said operating system, said application data and said operating system data may be restored from said second partition to said first partition without utilizing said filing level instructions.

8. The computer program product of claim 7, wherein said instruction means for writing said application data and operating system data within said first partition to said second partition on a sector-by-sector basis further comprises:

instruction means for sequentially copying said application data and said operating system data into a buffer from each of said at least one sector within said first partition; and instruction means, responsive to each copying sequence in which said application data and operating system data from each of said at least one sector is copied into a buffer, for writing the contents of said buffer into a corresponding sector within said second partition.

* * * * *